US008841365B2

(12) United States Patent
Marzouki et al.

(10) Patent No.: US 8,841,365 B2
(45) Date of Patent: Sep. 23, 2014

(54) METHOD FOR TRANSPORTING STRAIGHT RUN BITUMEN, AND BITUMEN MIXTURE

(75) Inventors: Taieb Marzouki, Thedinghausen (DE); Bertram Haupt, New Port Richey, FL (US)

(73) Assignee: Bertram Haupt, New Port Richey, FL (US)

( * ) Notice: Subject to any disclaimer, the term of this patent is extended or adjusted under 35 U.S.C. 154(b) by 1114 days.

(21) Appl. No.: 12/747,565

(22) PCT Filed: Dec. 12, 2008

(86) PCT No.: PCT/EP2008/010617
§ 371 (c)(1),
(2), (4) Date: Sep. 3, 2013

(87) PCT Pub. No.: WO2009/074348
PCT Pub. Date: Jun. 18, 2009

(65) Prior Publication Data
US 2014/0080947 A1    Mar. 20, 2014

(30) Foreign Application Priority Data

Dec. 12, 2007 (DE) .......................... 10 2007 060 314
Feb. 13, 2008 (DE) .......................... 10 2008 008 955
Mar. 6, 2008 (DE) .......................... 10 2008 012 932

(51) Int. Cl.
*C08L 95/00* (2006.01)
*C09D 195/00* (2006.01)
*C08L 101/00* (2006.01)

(52) U.S. Cl.
CPC ............... *C08L 95/00* (2013.01); *C08L 101/00* (2013.01); *C09D 195/00* (2013.01)

USPC .............................................. 524/70; 524/59

(58) Field of Classification Search
USPC ........................................................... 524/70
See application file for complete search history.

(56) References Cited

FOREIGN PATENT DOCUMENTS

| CH | 511 267 A | 8/1971 | |
| CH | 527 247 A | 8/1972 | |
| DE | 25 20 460 A1 | 11/1976 | |
| DE | 19952846 | * 5/2001 | .............. C98L 95/00 |
| DE | 10028107 | * 12/2001 | .............. C08L 95/00 |

OTHER PUBLICATIONS

Abstract of DE 10028107, Dec. 6, 2001.*
Abstract of DE 19952846, May 17, 2001.*
The International Search Report for PCT/EP2008/010617 dated Apr. 24, 2009.

* cited by examiner

*Primary Examiner* — Hui Chin
(74) *Attorney, Agent, or Firm* — Laurence P. Colton; Smith Risley Tempel Santos LLC

(57) ABSTRACT

Straight run bitumen is widely used in the production of built-structure waterproofing systems, more particularly waterproofing membranes. In order to be able to obtain supplies of straight run bitumen wherever it is obtainable at favorable prices, it would have to be transported over relatively long distances. Since straight run bitumen is viscid at ambient temperature, it would have to be transported hot, which is not possible with conventional straight run bitumen. According to the invention, the straight run bitumen is admixed with a small proportion of at least one hydrocarbonaceous polymer. This solidifies straight run bitumen at ambient temperatures, making it transportable cold in the solid state.

18 Claims, No Drawings

METHOD FOR TRANSPORTING STRAIGHT RUN BITUMEN, AND BITUMEN MIXTURE

BACKGROUND OF THE INVENTION

1. Technical Field

This invention relates to a method for transporting straight run bitumen and to a bitumen mixture for building construction purposes, preferably built-structure waterproofing systems, comprising straight run bitumen.

2. Prior Art

Straight run bitumen is an essential constituent of materials for building construction purposes, preferably built-structure waterproofing systems such as built-structure waterproofing membranes, bridge waterproofing systems and the like. The price of straight run bitumen differs from region to region and in fact may vary appreciably from country to country. It is therefore desirable to buy straight run bitumen wherever the price is comparatively low. But this makes it necessary to transport the straight run bitumen over longer distances. Since straight run bitumen is viscid at ambient temperatures, it has to be hot to be transported in tanks and/or tankers. However, such transportation of straight run bitumen obtained at a favorable price in a remote region is hitherto not possible.

BRIEF SUMMARY OF THE INVENTION

It is an object of the present invention to provide a method for transporting straight run bitumen and a bitumen mixture having a predominant content of straight run bitumen whereby transportation over relatively long distances is possible and economical.

We have found that this object is achieved by a method for transporting straight run bitumen, characterized in that the straight run bitumen is solidified with a small proportion of at least one hydrocarbonaceous polymer and is transported in the cold state as solid straight run bitumen. The inventors found that, surprisingly, straight run bitumen comprising a small proportion of at least one hydrocarbonaceous polymer becomes hard, more particularly hardens/solidifies. This is because the addition of the at least one hydrocarbonaceous polymer to the straight run bitumen raises the softening point of the latter appreciably. Consequently, straight run bitumen can be solidified with just a small proportion of at least one hydrocarbonaceous polymer. A very small amount of at least one hydrocarbonaceous polymer suffices. The hardened straight run bitumen is then simple to transport in the cold state as piece goods, for example in blocks.

The addition of a but small amount of at least one hydrocarbonaceous polymer endows straight run bitumen with thermoplastic properties whereby it is reversibly solidifiable by hardening in the cold state. Heating straight run bitumen comprising the at least one hydrocarbonaceous polymer causes it to become soft/liquid again by virtue of its thermoplastic properties.

In one particular form of the method, such a proportion of at least one hydrocarbonaceous polymer is added to the straight run bitumen that the melting point of the straight run bitumen is above 50° C. When transportation is to take place in very hot regions, the melting point can be raised, for example to 90° C., through an appropriate increase in the proportion of the at least one hydrocarbonaceous polymer.

Depending on how high the melting point of the straight run bitumen is supposed to be, the proportion of the one hydrocarbonaceous polymer, or the total proportion of two or more hydrocarbonaceous polymers, in the straight run bitumen need only be up to 10% by weight. Preferably, the proportion of the at least one hydrocarbonaceous polymer is in the range from 2% by weight to 6% by weight. Thus, a very small amount of one or optionally more hydrocarbonaceous polymers is sufficient to solidify straight run bitumen for economical transportation. The amount of hydrocarbonaceous polymer to be added to the straight run bitumen also depends on how hard the straight run bitumen is supposed to become in order that it may be readily transported over long distances. When, for example, only low stack heights of the blocks/packages of straight run bitumen are required in transportation, the straight run bitumen need not have a very high level of hardness, and so a comparatively low proportion of at least one hydrocarbonaceous polymer will be sufficient in order that the straight run bitumen may be rendered transportable over relatively long distances.

Preferably, the straight run bitumen has added to it such a, preferably single, hydrocarbonaceous polymer as leads to a solidifying in the course of a descending temperature passing through the lower limit of a narrow temperature range. In other words, at least one hydrocarbonaceous polymer leading to a rapid/abrupt change in the physical state of straight run bitumen at a defined temperature is used. Straight run bitumen comprising the hydrocarbonaceous polymer (in a small amount) rigidifies precipitously. This makes it possible to effect a targeted solidification of straight run bitumen, at a temperature which is predeterminable comparatively precisely and which ensures a permanently solid state of straight run bitumen in the cold state during transportation of straight run bitumen over comparatively long distances under varying climatic conditions.

The one, more or all hydrocarbonaceous polymers is/are added to the liquid straight run bitumen by metered addition. To this end, the straight run bitumen is heated up to 140° C. to 180° C., preferably to around 160° C. This makes it possible to achieve a very substantially homogeneous distribution of the at least one hydrocarbonaceous polymer in the straight run bitumen, and so the straight run bitumen will harden uniformly and, in particular, throughout when the liquid straight run bitumen after the addition of the at least one hydrocarbonaceous polymer is cooled down to a temperature that is not exceeded during transportation. The temperature at which through the adding of the hydrocarbonaceous polymer or two or more hydrocarbonaceous polymers a change in the physical state, viz., solidification, of the straight run bitumen occurs is predeterminable via the proportion of the at least one hydrocarbonaceous polymer admixed to the liquid straight run bitumen.

In an advantageous embodiment of the invention, just a single hydrocarbonaceous polymer is added to the straight run bitumen. This simplifies the solidification of the straight run bitumen. However, it is also conceivable for two or more identical or else different hydrocarbonaceous polymers to be added to the straight run bitumen, especially when particular further advantageous properties are to be obtained.

The method further provides for filling the straight run bitumen after the addition of the at least one hydrocarbonaceous polymer, while still hot and liquid, into an envelope. The envelope, configured as a sack or bag for example, consists of a thermoplastic, preferably polypropylene or polyethylene. Such an envelope has the advantage of not reacting with the hot straight run bitumen and the at least one hydrocarbonaceous polymer and more particularly of not affecting the properties of the straight run bitumen. The envelope also has the advantage that the straight run bitumen, which is still liquid and hot as it is being filled into the envelope, is thereby molded into the shape desired for transportation, for example by conferring on the straight run bitumen in hard state a blocklike shape formed by the shape of the sack.

Filling the straight run bitumen (comprising the at least one hydrocarbonaceous polymer admixed therewith) into the envelope takes place while the envelope is at least partly cooled from the outside. This ensures that the envelope is not melted by the still hot straight run bitumen during the filling operation. Preferably, cooling is applied not just in the course of filling the envelope but also after the filling and closing of the envelope. Cooling is applied until the straight run bitumen comprising the at least one hydrocarbonaceous polymer has cooled enough in the closed envelope to have solidified. Thereafter, the rigidified straight run bitumen, which is preferably situated in a sack, can be transported in the blocklike state.

The present invention further provides that the envelope be closed tight, more particularly by welding. The envelope is closed at least liquidtight, preferably also airtight, by, for example, welding, sealing and/or adhering. The tightly closed envelope makes it possible for the straight run bitumen comprising at least one hydrocarbonaceous polymer to be cooled with the envelope by dipping into a waterbath without water being able to get into the envelope in the process. Especially the airtightly closed envelope ensures that air cannot get at the straight run bitumen during transportation and that the straight run bitumen could be impaired by environmental effects. Finally, the at least liquidtight envelope ensures that straight run bitumen which has become soft as a result of unexpectedly high temperatures cannot get out of the envelopes during transportation. This applies especially when the sacklike envelopes are transported stacked on top of each other in several layers.

After transportation, the straight run bitumen to be put to the desired use is melted together with the envelope. This can be done in a heatable tank in which the solidified straight run bitumen is melted together with the envelope. When the straight run bitumen is further processed with normal bitumen or some other liquid material, the solid straight run bitumen is placed with the envelope in the liquid other bitumen or other liquid material. This liquid material has a temperature that leads to softening of the straight run bitumen comprising the at least one hydrocarbonaceous polymer and of the envelope, for example of a plastics sack, and so an altogether liquid mixable material is obtained.

A bitumen mixture for achieving the above object is characterized by a proportion of up to 10% by weight of at least one hydrocarbonaceous polymer. The bitumen mixture in question has added to it a proportion of up to 10% by weight, preferably 2% by weight to 6% by weight, of at least one hydrocarbonaceous polymer. When only a single hydrocarbonaceous polymer is used, the bitumen mixture only consists of straight run bitumen and the hydrocarbonaceous polymer, although as the case may be small amounts of other admixtures, including customary admixtures, can also be present in the straight run bitumen. Surprisingly, such a bitumen mixture of straight run bitumen and a small amount, of up to 10% by weight, of at least one hydrocarbonaceous polymer has been determined to lead to a hard or hardenable bitumen mixture which can be transported like piece goods, viz., as block with or without an envelope, at customary outside temperatures, over any distance.

Preference is given to using a single hydrocarbonaceous polymer having a defined chain length. The chain length is preferably in the range from $C_{50}$ to $C_{90}$, preferably $C_{50}$ to $C_{70}$. A hydrocarbonaceous polymer of this kind that has crystalline properties is particularly suitable. A polyolefin having preferably crystalline properties may be preferably concerned here. But it is also conceivable to admix the bitumen mixture with two or more hydrocarbonaceous polymers. In such a case, at least one hydrocarbonaceous polymer is formed by the single hydrocarbonaceous polymer described above. But it is also conceivable for all hydrocarbonaceous polymers to correspond in type and/or properties to the single hydrocarbonaceous polymer described above.

DETAILED DESCRIPTION OF A PREFERRED EMBODIMENT

A preferred illustrative embodiment of the invention will now be more particularly described:

The bitumen mixture according to the present invention comprises straight run bitumen comprising a small proportion of up to 10% by weight, for example 2% by weight to 6% by weight, of at least one hydrocarbonaceous polymer.

The at least one hydrocarbonaceous polymer preferably comprises a hydrocarbonaceous polymer having crystalline properties/a crystalline character and having a defined chain length. The chain length is preferably in the range from $C_{50}$ to $C_{90}$, more particularly in the range from $C_{50}$ to $C_{70}$. The at least one hydrocarbonaceous polymer preferably comprises a polyolefin having crystalline properties. The polyolefin has a chain length in the range from $C_{50}$ to $C_{90}$ and a solidification point of above 90° C. A polyolefin having a $C_{50}$ to $C_{70}$ chain length and a solidification point in the range from 90° C. to 110° C., preferably above 100° C., is used in particular. A bitumen mixture thus obtained has thermoplastic properties.

It is sufficient to use just a single hydrocarbonaceous polymer of the type described above. But it is also conceivable to use two or more hydrocarbonaceous polymers, in which case at least one hydrocarbonaceous polymer is a hydrocarbonaceous polymer as described in the preceding paragraph. If desired, however, it is also possible for all hydrocarbonaceous polymers to correspond to the hydrocarbonaceous polymer described in the preceding paragraph.

The aforementioned bitumen mixture is typically used for building construction purposes, preferably built-structure waterproofing systems. Such built-structure waterproofing systems may comprise roof waterproofing systems, preferably roof waterproofing membranes, or else bridge waterproofing systems. Bitumen mixtures based on straight run bitumen and at least one addition of a small amount of the above-described hydrocarbonaceous polymer or else two or more such hydrocarbonaceous polymers, however, can also be used for cellar waterproofing systems, exterior waterproofing systems and similar purposes in the building construction sector.

In the method of the present invention, the preferably purely straight run bitumen in the liquid state, brought about by warming/heating of the straight run bitumen, i.e. hot straight run bitumen, is admixed with the at least one further above-described hydrocarbonaceous polymer and everything is homogenized. The straight run bitumen is heated up to such a temperature that during the addition and preferably homogenizing of the at least one hydrocarbonaceous polymer as yet no solidification of the bitumen mixture of straight run bitumen and at least one hydrocarbonaceous polymer takes place. This temperature is preferably in the range from 120° C. to 180° C. and more preferably equal to about 160° C.

After completion of the addition and the homogenizing of the at least one hydrocarbonaceous polymer to the hot and liquid/flowable straight run bitumen, the bitumen mixture which is still liquid thereafter is cooled down to ambient temperature. This can be done without outside cooling. As soon as the bitumen mixture of straight run bitumen and the at least one hydrocarbonaceous polymer has cooled down to below the change-in-physical-state temperature defined via the proportion of the at least one hydrocarbonaceous polymer, the straight run bitumen solidifies by becoming hard and/or hardening. This change in physical state takes place within a very narrow temperature spectrum. The outcome of the cooling process is a bitumen mixture having a distinctly raised softening point and a hardness which permits transportation in the cold state as a solid material. The proportion of at least one hydrocarbonaceous polymer added to the straight run bitumen is preferably such that the solidification/rigidification of the bitumen mixture takes place at a certain temperature, preferably below 50° C. When straight run bitumen is to be transported through hotter territories, the change-in-physical-state temperature can be raised, for example to 70° C., 90° C. or else thereabove, via an appropriate proportion, preferably a higher proportion, of the at least one hydrocarbonaceous polymer.

After transportation, the bitumen mixture according to the present invention can be rendered soft, preferably liquid, again by heating by virtue of its thermoplastic properties. The solidifying/rigidifying of the straight run bitumen is thus reversed. This reversible operation is made possible by the addition of the at least one hydrocarbonaceous polymer, while the hydrocarbonaceous polymer is responsible for the fact that the temperature required to reliquefy the rigidified straight run bitumen is higher in the case of the bitumen mixture of the present invention than in the case of a straight run bitumen without at least one hydrocarbonaceous polymer.

In detail, the hardening of straight run bitumen comprising at least one hydrocarbonaceous polymer, the transporting and the melting are effected according to the method steps more particularly described hereinbelow:

The still hot straight run bitumen comprising at least one hydrocarbonaceous polymer is filled into plastics sacks, more particularly sacks composed of a thermoplastic, especially polypropylene or polyethylene. The sacks are formed from an endless film bubble. A section closed by a transversely directed seam is separated off the film bubble at a lower end to form a sack which is open at the top. This sack is filled with the still liquid, hot straight run bitumen comprising the at least one hydrocarbonaceous polymer. In the process, the sack is cooled from the outside, preferably with a cooling liquid such as water for example. The sack is very largely submerged in the cooling liquid as it is being filled with liquid and still hot straight run bitumen. After the sack has been filled with the straight run bitumen comprising at least one hydrocarbonaceous polymer, its upper end is closed, preferably again by welding with a seam. The seams at both ends of the sack are at least liquidtight, preferably also airtight, more particularly welded or else sealed/adhered. The sack closed liquid- and/or airtight is then completely immersed in the cooling liquid and preferably cooled down to room temperature, and so the straight run bitumen comprising at least one hydrocarbonaceous polymer rigidifies.

The sack, after cooling and the thereby ensuing solidification of the straight run bitumen, is removed from the waterbath and loaded onto a suitable means of transport. Depending on the form of transport, the sacks are stacked on pallets and secured on the pallets against slippage, for example by wrapping with a shrink film. The pallets of hard straight run bitumen can then be transported by any desired means of transport, including containers if desired, economically over relatively long distances.

After the sacks of hard straight run bitumen have been transported to the processing site, the straight run bitumen comprising the at least one hydrocarbonaceous polymer is reliquefied, together with the plastics sacks. This liquefying can be effected in various ways depending on the intended use of the straight run bitumen.

When the straight run bitumen comprising the at least one hydrocarbonaceous polymer is further processed without significant admixtures, the sacks containing the still hard straight run bitumen are introduced into a heatable tank and melted therein to temperatures between 80° C. and 120° C., preferably around 100° C., together with the sacks. The molten straight run bitumen is then further processed appropriately.

When the straight run bitumen is used as an addition to normal bitumen or some other basic material of construction, the straight run bitumen is melted by introducing it with the sacks into a bath of normal, liquid bitumen. The normal bitumen in this bath has a temperature sufficient to soften the straight run bitumen comprising the at least one hydrocarbonaceous polymer and the sack serving to package said straight run bitumen. This temperature is preferably in the range from 80° C. to 120° C. The straight run bitumen is then melted with the sack in the hot liquid normal bitumen, and so the straight run bitumen can be mixed with the normal bitumen or other basic materials of construction.

The at least one hydrocarbonaceous polymer, more particularly polyolefin, having thermoplastic properties, crystalline character and a defined chain length from $C_{50}$ to $C_{90}$ and a solidification point of above 90° C., admixed to the straight run bitumen, does not affect the other properties of the straight run bitumen. The same holds for the envelope surrounding the straight run bitumen, more particularly when the envelope comprises a plastics sack or some other plastics envelope. As a result, the bitumen mixture of the present invention behaves virtually exactly the same way as purely straight run bitumen, except that the bitumen mixture according to the present invention can be solidified/hardened for transportation and this solidifying/hardening can be reversed after transportation, by heating of the bitumen mixture.

The physical properties and the quality of a built-structure waterproofing system, more particularly a roof waterproofing membrane or a bridge waterproofing system, formed from the bitumen mixture of the present invention, comprising at least one hydrocarbonaceous polymer, are not adversely affected by the addition of the at least one hydrocarbonaceous polymer, more particularly polyolefin.

What is claimed is:

1. A method for transporting straight run bitumen, comprising solidifying the straight run bitumen with a small proportion of at least one hydrocarbonaceous polymer and transporting the straight run bitumen comprising the at least one hydrocarbonaceous polymer in the cold state as solid straight run bitumen.

2. The method according to claim 1, wherein a proportion of at least one hydrocarbonaceous polymer is added to the straight run bitumen such that the melting or softening point of the straight run bitumen comprising the at least one added hydrocarbonaceous polymer is above 50° C.

3. The method according to claim 1, wherein the straight run bitumen has added to it a proportion of up to 10% by weight of at least one hydrocarbonaceous polymer.

4. The method according to claim 1, wherein the at least one hydrocarbonaceous polymer added to the straight run bitumen leads to a solidifying or hardening of the straight run bitumen in the course of a descending temperature passing through the lower limit of a narrow temperature range.

5. The method according to claim 1, wherein the hydrocarbonaceous polymer is added to the straight run bitumen in a liquid state.

6. The method according to claim 1, wherein one of the at least one hydrocarbonaceous polymers has a defined chain length in the range from $C_{50}$ to $C_{90}$.

7. The method according to claim 1, wherein the straight run bitumen is reversibly solidified/hardened by the at least one hydrocarbonaceous polymer.

8. The method according to claim 1, further comprising introducing the straight run bitumen comprising the at least one hydrocarbonaceous polymer, while still hot and liquid, into an envelope and after the straight run bitumen comprising the at least one hydrocarbonaceous polymer has been introduced into the envelope, closing the envelope tight.

9. The method according to claim 8, wherein the envelope being filled with the still hot, liquid straight run bitumen is cooled to the point of hardening.

10. The method according to claim 9, further comprising liquefying the straight run bitumen comprising the at least one hydrocarbonaceous polymer again in the envelope together with the envelope.

11. The method according to claim 10, wherein the straight run bitumen comprising the at least one hydrocarbonaceous polymer is melted in a heatable tank together with the envelope.

12. The method according to claim 10, wherein the straight run bitumen comprising the at least one hydrocarbonaceous polymer is melted together with the envelope in a container containing normal bitumen.

13. The method according to claim 1, wherein the straight run bitumen has added to it a proportion of 2% by weight to 6% by weight of at least one hydrocarbonaceous polymer.

14. The method according to claim 3, wherein the straight run bitumen has added to it a single hydrocarbonaceous polymer.

15. The method according to claim 13, wherein the straight run bitumen has added to it a single hydrocarbonaceous polymer.

16. The method according to claim 1, wherein one of the at least one hydrocarbonaceous polymers has a defined chain length in the range from $C_{50}$ to $C_{70}$.

17. The method according to claim 1, wherein the hydrocarbonaceous polymer is added to the straight run bitumen in a viscid state.

18. The method according to claim 12, wherein the normal bitumen is a liquid.

* * * * *

UNITED STATES PATENT AND TRADEMARK OFFICE
CERTIFICATE OF CORRECTION

PATENT NO. : 8,841,365 B2
APPLICATION NO. : 12/747565
DATED : September 23, 2014
INVENTOR(S) : Taieb Marzouki It is certified that error appears in the above-identified patent and that said Letters Patent is hereby corrected as shown below:

Title page, item (75) Inventor(s) information "Taieb Marzouki, Thedinghausen (DE); Bertram Haupt, New Port Richey, FL (US)", the (75) Inventors information should read -Taieb Marzouki, Thedinghausen (DE)-.

Signed and Sealed this
Eighth Day of March, 2016

Michelle K. Lee
*Director of the United States Patent and Trademark Office*